United States Patent
Hirai et al.

(10) Patent No.: US 7,344,770 B2
(45) Date of Patent: Mar. 18, 2008

(54) CERAMICS HONEYCOMB STRUCTURAL BODY AND METHOD OF MANUFACTURING THE STRUCTURAL BODY

(75) Inventors: Sadaaki Hirai, Nagoya (JP); Takayuki Kawae, Nagoya (JP); Yasushi Kato, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 251 days.

(21) Appl. No.: 10/510,047

(22) PCT Filed: Apr. 11, 2003

(86) PCT No.: PCT/JP03/04622

§ 371 (c)(1),
(2), (4) Date: Oct. 1, 2004

(87) PCT Pub. No.: WO03/090929

PCT Pub. Date: Nov. 6, 2003

(65) Prior Publication Data

US 2005/0181172 A1 Aug. 18, 2005

(30) Foreign Application Priority Data

Apr. 25, 2002 (JP) ............................ 2002-123463
Mar. 4, 2003 (JP) ............................ 2003-056524

(51) Int. Cl.
*B32B 3/12* (2006.01)
(52) U.S. Cl. .................................................. 428/116
(58) Field of Classification Search ................ 422/180, 422/122, 177; 428/304.4, 307.3, 34.4, 116, 428/188, 192, 73
See application file for complete search history.

(56) References Cited

U.S. PATENT DOCUMENTS

| 4,255,316 A | 3/1981 | Blizzard |
| 6,242,072 B1* | 6/2001 | Ueda et al. ................. 428/116 |
| 2001/0003728 A1* | 6/2001 | Ito et al. ..................... 502/439 |

FOREIGN PATENT DOCUMENTS

| EP | 1 106 589 A2 | 6/2001 |
| JP | A-1-145377 | 6/1989 |
| JP | A-1-145378 | 6/1989 |
| JP | A 2000-51710 | 2/2000 |
| JP | A 2001-31465 | 2/2001 |
| JP | A 2001-226173 | 8/2001 |

* cited by examiner

*Primary Examiner*—Jennifer C. McNeil
*Assistant Examiner*—Gordon R. Baldwin
(74) *Attorney, Agent, or Firm*—Oliff & Berridge, PLC (57) ABSTRACT

The ceramics honeycomb structure of the present invention is formed of a plurality of cells forming a fluid flow passage partitioned by porous partition walls, and comprising an inflow end part allowing fluid to flow therein, an outflow end part allowing fluid to flow therefrom, and an outer peripheral part including an outer peripheral surface, and is characterized by having a structure where a porosity per unit volume ($cm^3$) gradually increases from the inflow end part side to the outflow end part side at a rate of 0.2%/mm or less, and this ceramics honeycomb structure has an excellent erosion resistance of partition walls positioned at a cell opening end part and a high compressive strength (isostatic strength) at the time of canning, and is suitable particularly as an automobile exhaust gas purification catalyst carrier.

10 Claims, 6 Drawing Sheets

CERAMICS HONEYCOMB STRUCTURAL BODY AND METHOD OF MANUFACTURING THE STRUCTURAL BODY

TECHNICAL FIELD

The present invention relates to a ceramics honeycomb structure having a porous structure and a method of manufacturing the same. More particularly, it relates to a ceramics honeycomb structure which has an excellent erosion resistance at its honeycomb end face and is well balanced in characteristics such as purification performance and canning properties and has the characteristics suitable, particularly, as carriers for automobile exhaust gas purification catalysts, and further relates to a method of manufacturing the ceramics honeycomb structure.

BACKGROUND ART

Ceramics honeycomb structures widely used for exhaust gas purification catalyst carriers are required to have a higher purification performance for coping with regulations on exhaust gas which have been yearly tightened and are further required to be reduced in pressure loss for reduction of fuel cost and increase of output.

Under the circumstances, there are increasing trends to increase the opening ratio at a cell opening end face of the honeycomb structures to reduce the pressure loss by thinning the thickness of partition walls of the honeycomb structures and to improve purification performance by reducing heat capacity of partition walls to cause early activation of catalyst after starting of engine.

On the other hand, with thinning of the partition walls of honeycomb structures, there is a new problem of occurrence of such an erosion phenomenon that various foreign matters incorporated in exhaust gas strike against the partition walls positioned at a cell opening end part to damage the partition walls.

For this problem, there has already been proposed a honeycomb structure in which the partition walls positioned at the cell opening end part have a partition wall reinforced portion (reinforced partition wall portion) increased in strength than other partition wall portions (for example, see patent document 1), and furthermore various investigations have been made on the method of providing the reinforced partition portion.

Hitherto, as a method of providing the partition wall reinforced portion, it has been known that a substrate having a honeycomb structure mainly composed of a raw material convertible into cordierite is fired, then a slurry prepared by dispersing the a raw material convertible into cordierite in a dispersion medium is applied to partition walls positioned at a cell opening end part of the substrate, and thereafter the substrate is dried and fired (for example, see patent document 1).

However, this method requires firing step which needs a long time at two stages, namely, firing of the substrate and firing for providing the partition wall reinforced portion, and thus has serious problems in production efficiency and production cost.

On the other hand, a method has been suggested which comprises applying a slurry prepared by dispersing a partition wall reinforcing material in a dispersion medium to partition walls positioned at the cell opening end part at a stage before firing the substrate of honeycomb structure, and then drying and firing the substrate, whereby firing of the substrate and formation of the partition wall reinforced portion are performed by one firing (for example, see patent document 1).

However, as to this method, no specific investigation is conducted on the difference in composition before and after the firing of the substrate. Especially, the substrate before firing usually contains organic binders and the like added for the purpose of improving strength of the partition walls, but no consideration has been given to the fact that most of the organic binders are water-soluble compounds such as methyl cellulose.

Therefore, if the step of formation of the partition wall reinforced portion which has conventionally been carried out after firing is carried out before firing using a slurry prepared by dispersing the partition wall reinforcing material in water, the organic binder dissolves in the slurry to cause distortion of partition walls of the resulting honeycomb structure to cause reduction of isostatic strength, and thus the honeycomb structure cannot be practically used.

Furthermore, in the case of using a slurry prepared by dispersing a partition wall reinforcing material in a dispersion medium, the partition wall reinforcing material settles or agglomerates due to its physical properties, and dispersibility of the partition wall reinforcing material is apt to be insufficient. Thus, variation or ununiformity of reinforcing degree tends to occur in the partition wall reinforced portion formed. Therefore, this production method suffers from the problems that a ceramic honeycomb structure having a uniform erosion resistance in the whole partition wall reinforced portion cannot be stably obtained, and besides burden of control for attaining uniform dispersion of the partition wall reinforcing material increases.

On the other hand, if a slurry prepared by dispersing a partition wall reinforcing material in a water-insoluble dispersion medium is used, the problem of reduction in isostatic strength caused by distortion of partition walls and others can be solved.

However, even this production method cannot solve the problems that a ceramic honeycomb structure having a uniform erosion resistance in the whole partition wall reinforced portion cannot be stably obtained, and besides burden of control for attaining uniform dispersion of the partition wall reinforcing material in the slurry increases.

Furthermore, with progress in thinning of the wall thickness of honeycomb structures as mentioned above, compressive strength (isostatic strength) of honeycomb structures at the time of canning considerably decreases and the honeycomb structures sometimes cannot be practically used.

(Patent document 1)

JP-A-2000-51710

The present invention has been made in view of the above problems in the conventional technologies, and the object is to provide a ceramics honeycomb structure which has an excellent erosion resistance in partition walls positioned at a cell opening end part and a high compressive strength (isostatic strength) at the time of canning and is suitable particularly as an automobile exhaust gas purification catalyst carrier, and a method for producing the ceramics honeycomb structure.

DISCLOSURE OF INVENTION

That is, according to the present invention, there is provided a ceramics honeycomb structure which is formed of a plurality of cells forming a fluid flow passage partitioned by porous partition walls and has an inflow end part allowing fluid to flow therein, an outflow end part allowing fluid to flow therefrom, and an outer peripheral part including an outer peripheral surface as its respective parts, characterized by having such a structure that a porosity per unit volume (cm$^3$) gradually increases from the inflow end part side to the outflow end part side at a rate of 0.2%/mm or less (the first invention).

In the present invention, it is preferred that the ceramics honeycomb structure has such a structure that the porosity per unit volume (cm$^3$) gradually increases from the inflow end part side to the outflow end part side at a rate of 0.1%/mm or less.

Furthermore, according to the present invention, there is provided a ceramics honeycomb structure which is formed of a plurality of cells forming a fluid flow passage partitioned by porous partition walls and has an inflow end part allowing fluid to flow therein, an outflow end part allowing fluid to flow therefrom, and an outer peripheral part including an outer peripheral surface as its respective parts, characterized by having such a structure that a porosity per unit volume (cm$^3$) gradually decreases from the central part of a section perpendicular to the flow passage of the cells to the outer peripheral part at a rate of 0.2%/mm or less (the second invention).

In the present invention, it is preferred that the ceramics honeycomb structure has such a structure that the porosity per unit volume (cm$^3$) gradually decreases from the central part of a section perpendicular to the flow passage of the cells to the outer peripheral part at a rate of 0.1%/mm or less.

In the present invention, it is preferred that a porosity per unit volume (cm$^3$) within the area of up to 150 mm from the flow passage end face of the inflow end part side in the inward direction of the flow passage is 10-50%.

In the present invention, it is preferred that the minimum thickness of the partition walls is 0.030-0.076 mm, and the ceramics honeycomb structure comprises at least one ceramics selected from the group consisting of cordierite, alumina, mullite, silicon nitride, aluminum titanate, zirconia and silicon carbide.

In the present invention, it is preferred that the section perpendicular to the flow passage has a shape of circle, ellipse, oval, trapezoid, triangle, tetragon, hexagon or left-right asymmetrical irregular shape, and the section of the cells perpendicular to the flow passage has a shape of triangle, tetragon or hexagon.

The ceramics honeycomb structure of the present invention is preferably used for automobile exhaust gas purification catalyst carriers, and preferably the ceramics honeycomb structure in which a catalyst component is supported on the partition walls is incorporated into a catalyst converter by being held at the outer peripheral surface of the outer wall.

Further, according to the present invention, there is provided a method for producing a ceramics honeycomb structure, characterized in that a dried substrate having a honeycomb structure is obtained using a clay mainly composed of a ceramics material, the substrate is coated with and impregnated with a reinforcing agent mainly composed of a compound having in its structure at least one element selected from the group consisting of Si, Ti, Mg and Al, and thereafter the substrate is fired (the third invention).

Moreover, according to the present invention, there is provided a method for producing a ceramics honeycomb structure, characterized in that a dried substrate having a honeycomb structure is obtained using a clay mainly composed of a ceramics material, the substrate is fired to obtain a fired substrate, the resulting fired substrate is coated with and impregnated with a reinforcing agent mainly composed of a compound having in its structure at least one element selected from the group consisting of Si, Ti, Mg and Al, and thereafter the substrate is fired again (the fourth invention).

In the present invention, said compound is preferably one which produces an inorganic oxide upon burning, and more preferably one which has a siloxane bond. In the present invention, said compound is preferably a silicone oil, a silicone varnish, an alkoxy oligomer or a mixture thereof. In the present invention, the reinforcing agent preferably has an absolute viscosity of 1-10000 mPa·s.

In the present invention, the ceramics material is preferably a raw material convertible into cordierite, and the clay preferably contains a water-soluble organic binder. This water-soluble organic binder preferably comprises at least one water-soluble compound selected from the group consisting of hydroxypropylmethyl cellulose, methyl cellulose, hydroxyethyl cellulose, carboxymethyl cellulose, polyvinyl alcohol and polyvinyl acetal.

BRIEF DESCRIPTION OF DRAWINGS

FIG. 4(a)-FIG. 4(c) schematically show one embodiment of the ceramics honeycomb structure of the present invention (the first invention)

BEST MODE FOR CARRYING OUT THE INVENTION

The embodiments of the present invention will be explained below. They should not be construed as limiting the invention in any manner, and it should be understood that optional changes, modifications and improvements may be made based on the normal knowledge of one skilled in the art without departing from the spirit and scope of the invention.

One embodiment of the ceramics honeycomb structure of the present invention (the first invention) is a ceramics honeycomb structure formed of a plurality of cells forming a fluid flow passage partitioned by porous partition walls and having an inflow end part allowing fluid to flow therein, an outflow end part allowing fluid to flow therefrom, and an outer peripheral part including an outer peripheral surface, characterized by having such a structure that a porosity per unit volume (cm$^3$) gradually increases from the inflow end part side to the outflow end part side at a rate of 0.2%/mm or less. A detailed explanation will be given below.

Figure 4A:
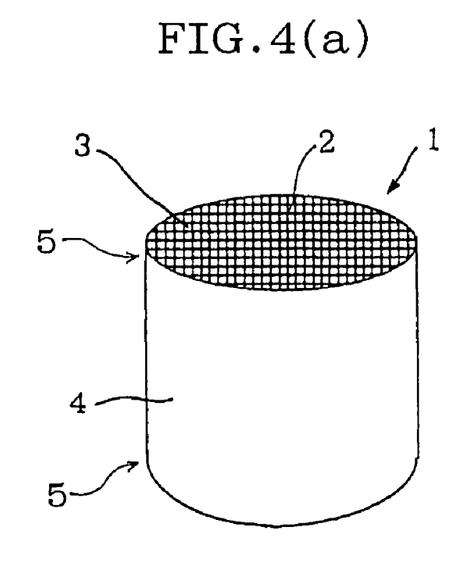
FIG. 4(a) is an oblique view.
Figure 4B:
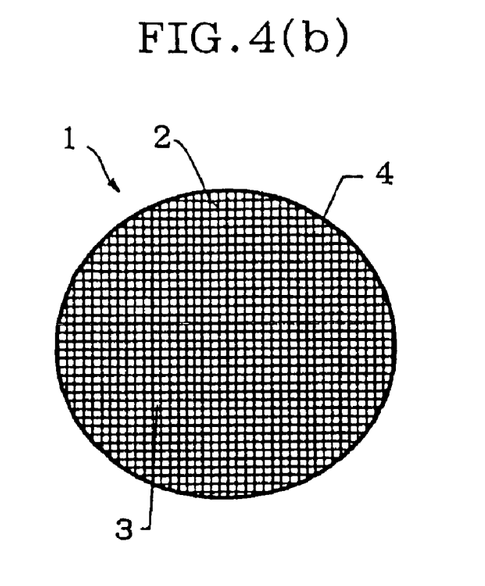
FIG. 4(b) is a plan view and FIG. 4(c) is a side view.
Figure 4C:
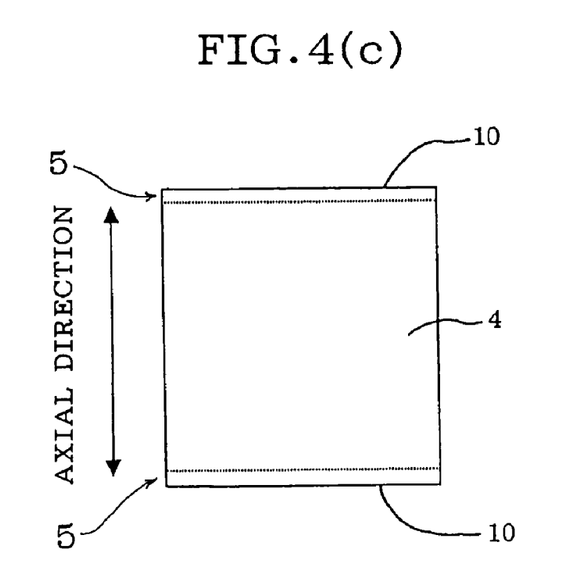

FIG. 4(a)-FIG. 4(c) schematically show one embodiment of the ceramics honeycomb structure of the present invention (the first invention), and FIG. 4(a) is an oblique view, FIG. 4(b) is a plan view and FIG. 4(c) is a side view. The ceramics honeycomb structure 1 is formed of a plurality of cells 3 partitioned by porous cell partition walls 2, and has a cell opening end part 5 (an inflow end part) allowing fluid to flow therein, a cell opening end part 5 (an outflow end part) allowing fluid to flow therefrom, and an outer wall 4 as its respective parts. In the ceramics honeycomb structure 1 of this embodiment, the porosity per unit volume ($cm^3$) of the inflow end part side is lower than that of the outflow end part side between the cell opening end parts 5, namely, the inflow end part side has denser microstructure. Therefore, the ceramics honeycomb structure of the present invention has the advantages that problems such as increase of heat capacity and deterioration of catalyst supportability with increase of weight hardly occurs as compared with a ceramics honeycomb structure which is reduced in porosity uniformly through the structure. The reference numeral 10 in FIG. 4(c) indicates the opening end part.

Furthermore, a case is supposed where the ceramics honeycomb structure of this embodiment is used as a carrier for exhaust gas purification catalyst by disposing the inflow end part lower in porosity per unit volume ($cm^3$) at the inflow side (upstream side) of the exhaust gas which is a fluid to be treated. In this case, when foreign matters (such as oxidation scales) present in the exhaust gas strike against the partition walls, the walls are hardly damaged because the porosity per unit volume ($cm^3$) of the partition walls is lower than that of the partition walls disposed on the downstream side, and thus occurrence of erosion phenomenon can be inhibited.

From the viewpoint of more effective inhibition of the erosion phenomenon, it is preferred for the ceramics honeycomb structure of this embodiment that the porosity per unit volume ($cm^3$) gradually increases from the inflow end part side to the outflow end part side at a rate of 0.1%/mm or less.

Next, an embodiment of the second invention will be explained. One embodiment of the second invention is a ceramics honeycomb structure which is formed of a plurality of cells forming a fluid flow passage partitioned by porous partition walls and has as its respective parts an inflow end part allowing fluid to flow therein, an outflow end part allowing fluid to flow therefrom, and an outer peripheral part including an outer peripheral surface, characterized by having such a structure that a porosity per unit volume ($cm^3$) gradually decreases from the central part of a section perpendicular to the flow passage of the cells towards the outer peripheral part at a rate of 0.2%/mm or less. The details will be explained below.

In the ceramics honeycomb structure of this embodiment, the porosity per unit volume ($cm^3$) of the outer peripheral part is lower than that of the central part, namely, the outer peripheral part has a denser microstructure. Therefore, the ceramics honeycomb structure of the present invention has the advantages that problems such as increase of heat capacity and deterioration of catalyst supportability with increase of weight hardly occur as compared with a ceramics honeycomb structure which is decreased in porosity uniformly through the structure.

A case is supposed where the ceramics honeycomb structure of this embodiment is used by holding (canning) it in a suitable holding container, holding jig, etc. In this case, since the porosity per unit volume ($cm^3$) of the outer peripheral part which contacts with the holding container, jig, etc. is lower than that of the central part, the ceramics honeycomb structure has a sufficient isostatic strength and hence can be surely held in the holding container, holding jig, etc. and problems such as damaging caused by load of compressive face pressure hardly occur. The term "isostatic strength" here means a strength shown by a pressure value applied at breaking in the test in accordance with automobile standard JASO M505-87.

From the viewpoint of more effectively avoiding the problems such as increase of heat capacity due to increase of mass and decrease of catalyst supporting properties, it is preferred for the ceramics honeycomb structure of this embodiment that the porosity per unit volume ($cm^3$) gradually decreases from the central part of a section perpendicular to the flow passage of the cells to the outer peripheral part at a rate of 0.1%/mm or less.

Assuming that the ceramics honeycomb structures of the first and second embodiments are used mainly as carriers for catalysts for purification of exhaust gas, from the viewpoints of catalyst supportability and isostatic strength, the porosity per unit volume ($cm^3$) in the area of up to 150 mm from the flow passage end face of the inflow end part side in the inward direction of the flow passage is preferably 10-50%, more preferably 15-45%, especially preferably 20-40%.

The thickness of the partition walls of the ceramics honeycomb structures of the first and second embodiments is not particularly limited, but it is preferably thinner for the improvement of purification performance at the time of warming up by weight-saving and reduction of heat capacity while reducing pressure loss, and specifically it is preferably 0.030-0.076 mm, more preferably 0.030-0.065 mm in minimum partition wall thickness. Furthermore, in the case of the ceramics honeycomb structures of the first and second embodiments, even when the minimum partition wall thickness is less than 0.050 mm, there is substantially no possibility of occurrence of deformation in partition walls.

Figure 5:
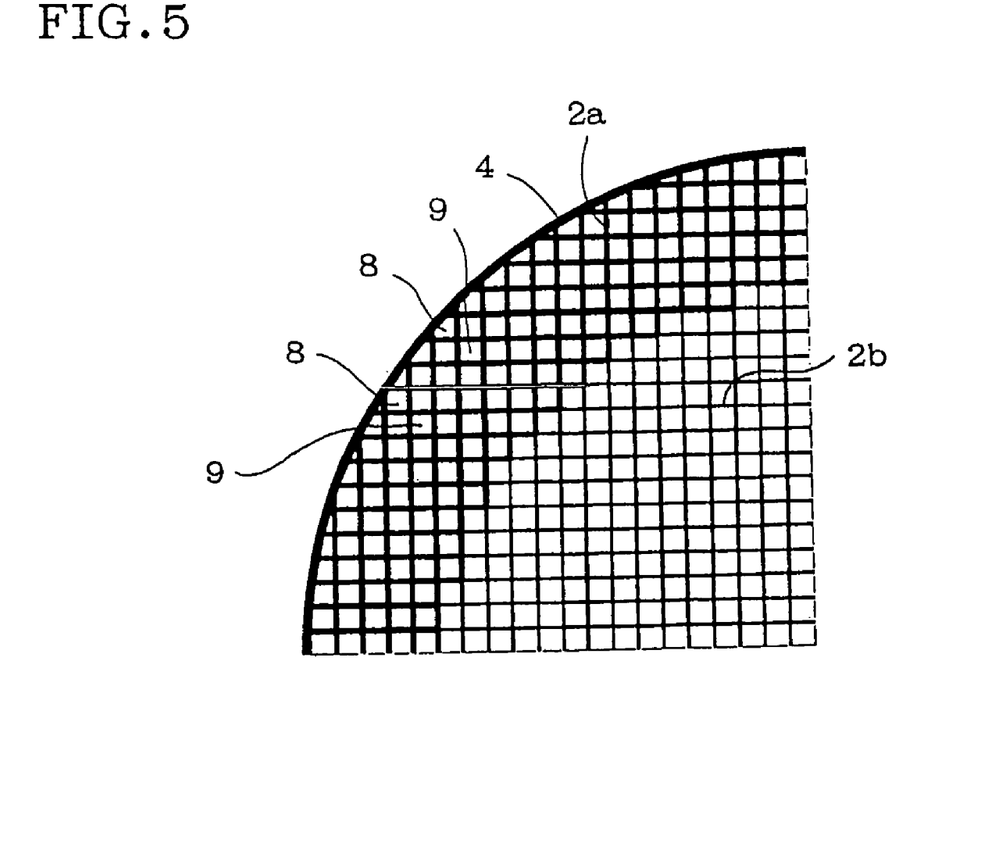
FIG. 5 is a partially enlarged view which shows another embodiment of the ceramics honeycomb structure of the present invention (the first and second inventions).

In the first and second embodiments, it is also preferred for improving erosion resistance to increase the thickness of cell partition walls 2a on the outer peripheral part side as shown in FIG. 5. Moreover, by increasing the thickness of cell partition walls 2a on the outer peripheral part side, isostatic strength can be improved and holding force at the time of canning can also be increased to improve canning properties. The isostatic strength here is a strength expressed by a pressure value applied at breaking in the test in accordance with automobile standard JASO M505-87. In FIG. 5, outermost peripheral cells 8 are present closest to the outer wall 4, and the second cells 9 are present inwardly continuing from the outermost peripheral cells 8. The thickness of the partition walls of the outermost peripheral cells is shown by $Tr_1$ and the thickness of the partition walls of the cells 9 positioned inwardly second from the outermost peripheral cells 8 is shown by $Tr_2$. Although not shown, thickness of partition walls of the 5th to 15th cells are similarly shown by $Tr_{5-15}$. The cell partition walls 2 are divided broadly into outer peripheral cell partition walls 2a and basic cell partition walls 2b.

In the embodiments of the first and second inventions, when the outermost peripheral cells are called starting point cells, the cells in the range of the 3rd to 20th cells positioned on the inside of the starting point cells are called end point cells, and the cells positioned on the inside of the end point cells are called basic cells, it is preferred that the thickness ($Tr_1$, $Tr_{3-20}$) of the partition walls forming the starting point cells and the end point cells and the thickness (Tc) of the partition walls forming the basic cells satisfy the relation: $1.10 \leq (Tr_1, Tr_{3-20})/Tc \leq 3.00$. If this value [($Tr_1$, $Tr_{3-20}$)/Tc]

is less than 1.10, it does not contribute to the improvement of erosion resistance and the improvement of isostatic strength, and thus it does not contribute to the improvement of canning properties. If the value exceeds 3.00, heat capacity and pressure loss increase. Even if the thickness ($Tr_1$, $Tr_2$) of partition walls of the first and second cells is increased at a specific rate, it does not contributes to the improvement of erosion resistance or isostatic strength, and if the thickness of partition walls of the 21st and the following cells, particularly, the 31st and the following cells, is increased at a specific rate, the pressure loss increases and furthermore the heat capacity also increases due to the increase of mass of the ceramics honeycomb structure to more than a specific value.

Moreover, in the embodiments of the first and second inventions, considering the heat capacity and pressure loss, it is practically preferred to further limit the conditions in such a manner that the thickness of the partition walls ($Tr_1$, $Tr_{3-20}$) and the thickness of the basic cells (Tc) have the relation: $1.10 \leq (Tr_1, Tr_{3-20})/Tc \leq 2.50$, furthermore, $1.20 \leq (Tr_1, Tr_{3-20})/Tc \leq 1.60$.

The ceramics honeycomb structures of the embodiments of the first and second inventions comprise, for example, at least one ceramics selected from the group consisting of cordierite, alumina, mullite, silicon nitride, aluminum titanate, zirconia and silicon carbide.

Furthermore, it is preferred that the section perpendicular to the flow passage of the ceramics honeycomb structures of the embodiments of the first and second inventions has a shape of, for example, circle, ellipse, oval, trapezoid, triangle, tetragon, hexagon or irregular shape asymmetrical in left and right. Among them, circle, ellipse or oval is preferred.

The section of the cells perpendicular to the flow passage of the ceramics honeycomb structures of the embodiments of the first and second inventions has a shape of polygon such as triangle, square, rectangle, and hexagon, and preferred is triangle, tetragon or hexagon.

Figure 6:
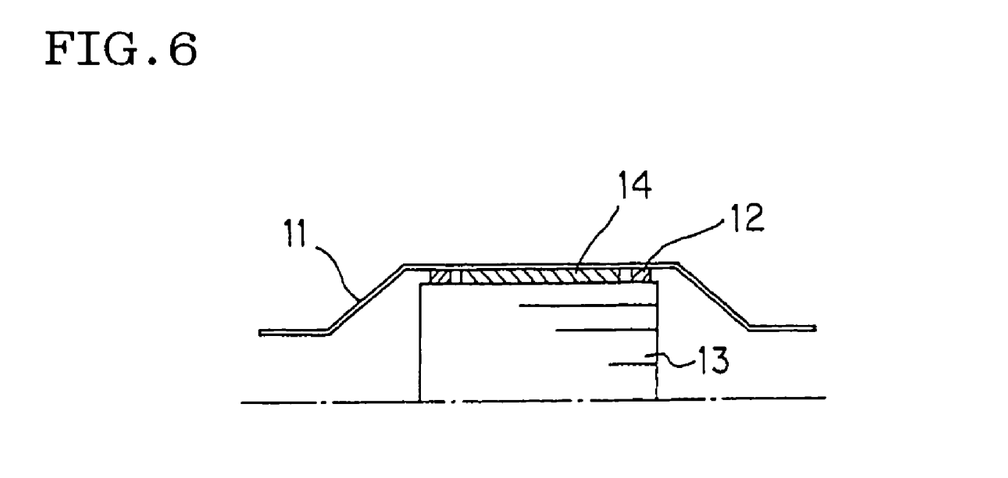
FIG. 6 schematically shows an example in which the ceramics honeycomb structure is incorporated in a converter container.

The ceramics honeycomb structures of the embodiments of the first and second inventions are not particularly limited in their uses, and can be used for various uses such as various filters and catalyst carriers, and especially preferably they are used as carriers for automobile exhaustion gas purification catalysts. Moreover, the ceramics honeycomb structures of the embodiments of the first and second inventions are preferably used by incorporating in a catalyst converter container 11 as shown in FIG. 6. Here, the ceramics honeycomb structure 13 is incorporated in the catalyst converter container 11 with its outer peripheral surface being held by a ring 12. The material of ring 12 is not particularly limited, and ordinarily a ring made of metallic mesh is used. It is preferred to provide a holding material 14 such as mat or cloth between the catalyst converter container 11 and the outer peripheral surface of the ceramics honeycomb structure 13.

Next, an embodiment of the present invention (the third invention) will be explained. One embodiment of the third invention is a method for manufacturing the ceramics honeycomb structure having the characteristics as aforementioned, characterized in that a dried substrate having a honeycomb structure before firing is obtained using a clay mainly composed of a ceramics material, the substrate is coated and impregnated with a reinforcing agent mainly composed of a compound having in its structure at least one element selected from the group consisting of Si, Ti, Mg and Al, and thereafter the substrate is fired. The details will be explained below.

According to this embodiment, since firing of the substrate and gradual increase (gradual decrease) of the porosity per unit volume ($cm^3$) are simultaneously performed by one firing, improvement of productivity and reduction of cost can be attained. Further, there is used a reinforcing agent mainly composed of a compound having in its structure an element contributing to gradual increase (gradual decrease) of the porosity of the resulting ceramics honeycomb structure, namely, element contributing to improvement of strength, specifically, at least one element selected from the group consisting of Si, Ti, Mg and Al. Here, assuming a case where a water-soluble organic binder is used in making the substrate, even when the substrate (a dried product before firing) is coated and impregnated with the reinforcing agent, the water-soluble organic binder does not dissolve and swell since the compound is hydrophobic, and thus deformation of partition walls such as distortion of cells are not caused. Therefore, a method including a step of making the substrate by adding the water-soluble organic binder to the clay is especially preferred, and by this method, there can be produced a ceramics honeycomb structure having no problems such as deformation.

Moreover, in this embodiment, since a reinforcing agent mainly composed of a compound having in its structure an element contributing to improvement of strength, the element is uniformly distributed through the whole substrate due to its physicochemical properties. Therefore, a ceramics honeycomb structure uniformly improved in strength can be produced without particular measures such as dispersion, and local occurrence of erosion can be nearly avoided. Furthermore, by using the reinforcing agent as mentioned above, ceramics honeycomb structures having no variation in erosion resistance among products, and excellent in erosion resistance can be stably obtained through simple steps.

Next, an embodiment of the present invention (the fourth invention) will be explained. One embodiment of the fourth invention is a method for producing a ceramics honeycomb structure, characterized in that a dried substrate having a honeycomb structure before firing is obtained using a clay mainly composed of a ceramics material, the substrate is fired to obtain a fired substrate, the resulting fired substrate is coated with and impregnated with a reinforcing agent mainly composed of a compound having in its structure at least one element selected from the group consisting of Si, Ti, Mg and Al, and thereafter the substrate is fired again.

That is, not the substrate (dried substrate before firing) is coated and impregnated with the reinforcing agent, but a previously fired-substrate is coated and impregnated with the reinforcing agent, and then the substrate is re-fired, and according to this method, a ceramics honeycomb structure having substantially no problems such as deformation and improved in strength can be produced. In addition, ceramics honeycomb structures having no variation in erosion resistance among products, and excellent in erosion resistance can be stably obtained through simple steps. Each step will be explained below.

In the embodiments of the third and fourth inventions, a substrate which is a dried product having a honeycomb structure, specifically, a substrate which is a dried product having a honeycomb structure and a plurality of cells forming a fluid flow passage partitioned by partition walls in the form of honeycomb is molded using a clay mainly composed of a ceramics material.

The ceramics materials are not particularly limited, and there may be used, for example, at least one material selected from the group consisting of silicon carbide, boron carbide, titanium carbide, zirconium carbide, silicon nitride, boron nitride, aluminum nitride, alumina, zirconia, a raw material convertible into cordierite, aluminum titanate and sialon. The relation between the kind of the ceramics material and that of the reinforcing material will be mentioned hereinafter.

In the embodiments of the third and fourth inventions, if necessary, the clay may contain other additives. Specifically, there may be contained water-soluble organic binders, crystal growth assistants, dispersants, pore forming agents, etc. The water-soluble organic binders include, for example, hydroxypropylmethyl cellulose, methyl cellulose, hydroxyethyl cellulose, carboxymethyl cellulose, polyvinyl alcohol, polyvinyl acetal, etc. The crystal growth assistants include, for example, magnesia, silica, yttria, iron oxide, etc., and the dispersants include, for example, ethylene glycol, dextrin, fatty acid soaps, polyalcohols, etc. Moreover, the pore forming agents include, for example, graphite, wheat flour, starch, phenolic resins, polyethylene terephthalate, etc. These additives can be used each alone or in admixture of two or more depending on the purpose.

The clay can be prepared by usual methods, and, for example, it can be obtained by adding additives such as water-soluble organic binder to a ceramics material to prepare a raw material, adding thereto water in a suitable amount, and, if necessary, adding other additives, followed by kneading the mixture by a kneader, a pressure kneader, a vacuum kneader or the like.

In the embodiments of the third and fourth inventions, there are also no limitations in the method for molding the substrate having a honeycomb structure, but extrusion molding is preferred from the point of excellent mass-productivity, and it is preferred to carry out the extrusion molding using extrusion molding apparatuses such as ram type extrusion molding apparatus and twin-screw type continuous extrusion molding apparatus.

Furthermore, the thickness of the partition walls forming cells is also not particularly limited, and, for example, even if the thickness of partition walls is thin, namely, 0.05 mm or less, there can be obtained a ceramics honeycomb structure excellent in physical strengths.

In the embodiments of the third and fourth inventions, the substrate which is a dried substrate before firing (unfired substrate) or the fired substrate is coated and impregnated with a given reinforcing agent shown below. In the embodiments of the third and fourth inventions, the similar reinforcing agent can be used at any stages. Therefore, the following explanation is made of a case where a substrate which is a dried substrate before firing is coated and impregnated with the reinforcing agent, but the same can be applied to the case where the fired substrate is coated and impregnated with the reinforcing agent.

As the reinforcing agents, there are used those which are mainly composed of a compound having in its structure such an element which reduces the melting point of the ceramics material constituting the substrate or penetrates into pores in the substrate to reduce the volume of the pores, thereby densifying the substrate and contributing to the improvement of strength of the resulting ceramics honeycomb structure. As such elements, mention may be made of at least one element selected from the group consisting of Si, Ti, Mg and Al. The compound which is a main component of the reinforcing agent is preferably one which produces an inorganic oxide upon burning.

Of the compounds as a main component of the reinforcing agent, the compounds having Si in the structure are preferably organic compounds having a siloxane bond, and preferred examples thereof are silicone oil, silicone varnish, silicate alkoxy oligomer, mixtures thereof, etc. As the compound having Si in the structure, silica ($SiO_2$) can be used, but since silica ($SiO_2$) per se is not liquid, it must be dispersed in a dispersion medium before use.

Examples of the silicone oil include, for example, dimethyl silicone oil, methylphenyl silicone oil, methyl hydrogen silicone oil, amino-modified silicone oil, epoxy-modified silicone oil, carboxyl-modified silicone oil, carbinol-modified silicone oil, methacryl-modified silicone oil, mercapto-modified silicone oil, phenol-modified silicone oil, one-terminal reactive silicone oil, different-functional groups-modified silicone oil, polyether-modified silicone oil, methylstyryl-modified silicone-oil, alkyl-modified silicone oil, higher fatty acid ester-modified silicone oil, etc.

Among the compounds as a main component of the reinforcing agents, preferred examples of those which have Ti and/or Al in the structure are aluminate alkoxy oligomers such as acetoalkoxyaluminum diisopropyrate, titanate alkoxy oligomers used as coupling agents, etc.

Among the compounds as a main component of the reinforcing agents, there may be used, for example, magnesia (MgO) as a compound having Mg in the structure, but since magnesia (MgO) per se is not liquid, it must be dispersed in a dispersion medium before use.

In the embodiments of the third and fourth inventions, the reinforcing agents can be prepared by using the above compound each alone or in admixture of two or more, and preferably two or more of the compounds are used in admixture. When the reinforcing agent is prepared by using two or more in admixture, since compounds having various viscosities can be selected and mixed, viscosity of the reinforcing agent can be optionally adjusted and thus it becomes easy to uniformly coat and impregnate the substrate with the resulting reinforcing agent. Furthermore, by optionally selecting and mixing the compounds, the degree of reinforcement can be controlled with securing the desired thermal shock resistance, and desired erosion resistance can be imparted depending on the thickness of partition walls, etc. Specifically, it is preferred to use reinforcing agents prepared by mixing dimethyl silicone oil with silicate alkoxy oligomer or methylhydrogen silicon oil.

In the case of these reinforcing agents, the mixing ratio (SAO or MHSO/DMSO) of silicate alkoxy oligomer (SAO) or methyl hydrogen silicone oil (MHSO) and dimethyl silicone oil (DMSO) is preferably 10/90-75/25 (mass ratio), more preferably 15/85-50/50 (mass ratio), further preferably 20/80-50/50 (mass ratio), especially preferably 25/75-50/50 (mass ratio). When the mixing ratio is within the above range, a honeycomb structure excellent in erosion resistance can be obtained with securing the desired thermal shock resistance.

Moreover, the reinforcing agents used in the embodiments of the third and fourth inventions may be those which are prepared by diluting the compound such as silicone oil or the like with a diluent containing one or two or more of aromatic hydrocarbons such as toluene and xylene, aliphatic hydrocarbons such as petroleum ethers and kerosene, petroleum hydrocarbons such as kerosene and light oil, alcohols such as isopropyl alcohol, lauryl alcohol and butanol, and volatile silicone oils. By using such diluent, the degree of reinforcement can be optionally controlled and further the viscosity of reinforcing agent can be optionally adjusted, and thus the substrate can be uniformly coated and impregnated with the thus obtained reinforcing agent.

The reinforcing agents used in the embodiments of the third and fourth inventions have an absolute viscosity of preferably 1-10000 mPa·s, more preferably 10-1000 mPa·s. In general, the compounds of low viscosity are small in polymerization degree and easily volatilized, and if the viscosity is lower than 1 mPa·s, when the partition walls are coated and impregnated with the reinforcing agent and fired, generation of $CO_2$ and evaporation of $H_2O$ occur, and simultaneously the effective component such as Si present in the reinforcing agent is also volatilized, and as a result it becomes difficult to impart strength. On the other hand, if the viscosity exceeds 10000 mPa·s, it becomes difficult to coat and impregnate the substrate with the reinforcing agent at a uniform thickness.

Furthermore, as for the compounds which constitute a main component of the reinforcing agents used in the embodiments of the third and fourth inventions, it is preferred to select suitable one depending on the kind of the ceramics raw materials For example, in the case of a clay mainly composed of a raw material convertible into cordierite, it is preferred to use a reinforcing agent mainly composed of a compound having Si in the structure, specifically a reinforcing agent mainly composed of silicone oil or the like.

For coating and impregnating the substrate with the reinforcing agent, the substrate can be impregnated with the reinforcing agent prepared in the form of liquid or slurry. Specifically, in order to produce a ceramics honeycomb structure in which the porosity per unit volume ($cm^3$) gradually increases from the inflow end part side to the outflow end part side, a sufficient amount of the reinforcing agent is prepared and the whole of the substrate is dipped therein, whereby the substrate is coated and impregnated with the reinforcing agent, and thereafter a compressed air is blown thereinto from the outflow end part side to gradually increase the amount of the reinforcing agent applied to the substrate towards the inflow end part side. The reinforcing agent may be coated on the substrate by spray coating, followed by blowing a compressed air thereinto from the outflow end part side to gradually increase the amount of the reinforcing agent applied thereto towards the inflow end part side.

In order to produce a ceramics honeycomb structure in which the porosity per unit volume ($cm^3$) gradually decreases from the central part of a section perpendicular to the flow passage direction of cells towards the outer peripheral part, the substrate can be coated and impregnated with the reinforcing agent, and can be impregnated with the reinforcing agent prepared in the form of liquid or slurry. That is, in order to produce a ceramics honeycomb structure in which the porosity per unit volume ($cm^3$) gradually decreases from the central part of a section perpendicular to the flow passage direction of cells towards the outer peripheral part, a sufficient amount of the reinforcing agent is prepared and the whole of the substrate is dipped therein, whereby the substrate is coated and impregnated with the reinforcing agent, and then a compressed air or the like is blown thereinto from the inflow end part side or the outflow end part side to remove the reinforcing agent applied in an excess amount by the compressed air and the like. Specifically, the ceramics honeycomb structure can be produced by gradually reducing the pressure of the blown compressed air from the central part of a section perpendicular to the flow passage direction of cells towards the outer peripheral part, reducing the amount of the blown compressed air or shortening the blowing time.

Furthermore, the ceramics honeycomb structure in which the porosity per unit volume ($cm^3$) gradually decreases from the central part of a section perpendicular to the flow passage direction of cells towards the outer peripheral part can also be produced by a method of stepwise coating and impregnation of the reinforcing agent which is gradually increased in concentration from the central part of a section perpendicular to the flow passage direction of cells towards the outer peripheral part.

Then, the substrate coated and impregnated with the reinforcing agent is fired. The substrate and reinforcing agent are preferably previously dried before firing. The drying methods include air-flow drying, hot-air drying, microwave drying, etc. The firing conditions are preferably optionally and suitably selected depending on the kinds of substrate and reinforcing agent. For example, when the substrate is mainly composed of a cordierite-based material and the reinforcing agent is mainly composed of a compound having Si in the structure, such as silicone oil, the firing may be carried out at 1300-1500° C.

On the other hand, the firing conditions for coating and impregnating with the reinforcing agent the substrate in the state of fired substrate after firing can be in accordance with conventional methods, and can be optionally selected depending on the kind of the substrate. For example, when the substrate is mainly composed of a cordierite-based material, the firing may be carried out at 1300-1500° C. Moreover, the refiring conditions for carrying out refiring after the fired substrate is coated and impregnated with the reinforcing agent can be the firing conditions in the case of coating and impregnating the substrate with the impregnating agent as mentioned above. Specifically, the reinforcing agent is preferably previously dried before refiring, and preferably optional and desired firing conditions are selected depending on the kinds of substrate and reinforcing agent.

By carrying out the above steps, a ceramics honeycomb structure having an excellent erosion resistance of the partition walls positioned in the inflow end part and a high compressive strength (isostatic strength) at the time of canning can be simply produced without resulting in variation in characteristics among products. Furthermore, in this ceramics honeycomb structure, the porosity per unit volume ($cm^3$) gradually increases from the inflow end part side to the outflow end part side or gradually decreases from the central part of a section perpendicular to the flow passage direction of cells towards the outer peripheral part.

The present invention will be explained more specifically by the following examples, which should not be construed as limiting the invention in any manner.

Columnar ceramics honeycomb structures having a partition wall thickness of 50 μm, a diameter of 100 mm and a height of 100 mm, having tetragonal cells at a density of 140 cells/$cm^2$, and having an opening ratio of 88% were produced by the following procedures (Examples 1-13 and Comparative Examples 1-4). All the produced ceramics honeycomb structures had no catalyst (supporting no catalyst).

EXAMPLES 1-10

A mixture obtained by mixing 100 parts by mass of a ceramics raw material comprising a raw material convertible into cordierite with 8 parts by mass of methyl cellulose, 0.5 part by mass of potassium laurate, 2 parts by mass of polyether and 28 parts by mass of water was introduced into a continuous extrusion molding machine to prepare a substrate having a honeycomb structure (unfired substrate).

The resulting substrate was wholly dipped in a reinforcing agent shown in Table 1 to coat and impregnate the whole substrate with the reinforcing agent. Then, a compressed air was blown thereinto from the outflow end part side to gradually increase the amount of the coated reinforcing agent towards the inflow end part side, and simultaneously to remove excessively coated reinforcing agent, followed by firing at 1400° C. for 4 hours to produce a ceramics honeycomb structure (Examples 1-10).

EXAMPLE 11

A ceramics honeycomb structure was produced in the same manner as in Examples 1-10, except for using a reinforcing agent prepared by adding 0.5 part by mass of a dispersant (polyoxyalkylene-based polymer manufactured by Nippon Oil & Fats Co., Ltd.: MARIALIM AKM-0531) to 100 parts by mass of a dispersion obtained by dispersing 5% by mass of silica ($SiO_2$) powder in kerosene as a dispersion medium (Example 11).

EXAMPLE 12

A ceramics honeycomb structure was produced in the same manner as in Examples 1-10, except that the substrate having a honeycomb structure (unfired substrate) was fired at 1400° C. for 4 hours before wholly dipping in the reinforcing agent and the resulting fired substrate was wholly dipped in the reinforcing agent shown in Table 1 (Example 12).

EXAMPLE 13

A ceramics honeycomb structure was produced in the same manner as in Examples 1-10, except that the amount of the reinforcing agent applied was gradually increased from the central part of a section perpendicular to the flow passage direction of cells towards the outer peripheral part by making a difference in air blow pressure between the inner peripheral part and the outer peripheral part in blowing the compressed air from the flow passage end part side, and the excessively applied reinforcing agent was removed (Example 13).

COMPARATIVE EXAMPLE 1

A columnar ceramics honeycomb structure was produced in the same manner as in Examples 1-10, except that the substrate was not wholly dipped in the reinforcing agent (no treatment with the reinforcing agent) (Comparative Example 1).

COMPARATIVE EXAMPLE 2

A columnar ceramics honeycomb structure was produced in the same manner as in Examples 11, except that the substrate having a honeycomb structure (unfired substrate) was dipped in the reinforcing agent up to a depth of 5 mm from the opening end face to coat and impregnate the partition walls positioned in the vicinity of the inflow end part with the reinforcing agent in place of wholly dipping the substrate having a honeycomb structure (unfired substrate) in the reinforcing agent (Comparative Example 2).

COMPARATIVE EXAMPLE 3

A ceramics honeycomb structure was produced in the same manner as in Comparative Examples 1 (Comparative Example 3).

COMPARATIVE EXAMPLE 4

A ceramics honeycomb structure was produced in the same manner as in Example 13, except that an extremely large difference in air blow pressure between the inner peripheral part and the outer peripheral part was made in blowing the compressed air from the flow passage end part side, specifically, the air blow pressure was greatly increased with progress from the inner peripheral part to the outer peripheral part (Comparative Example 4).

Figure 3:
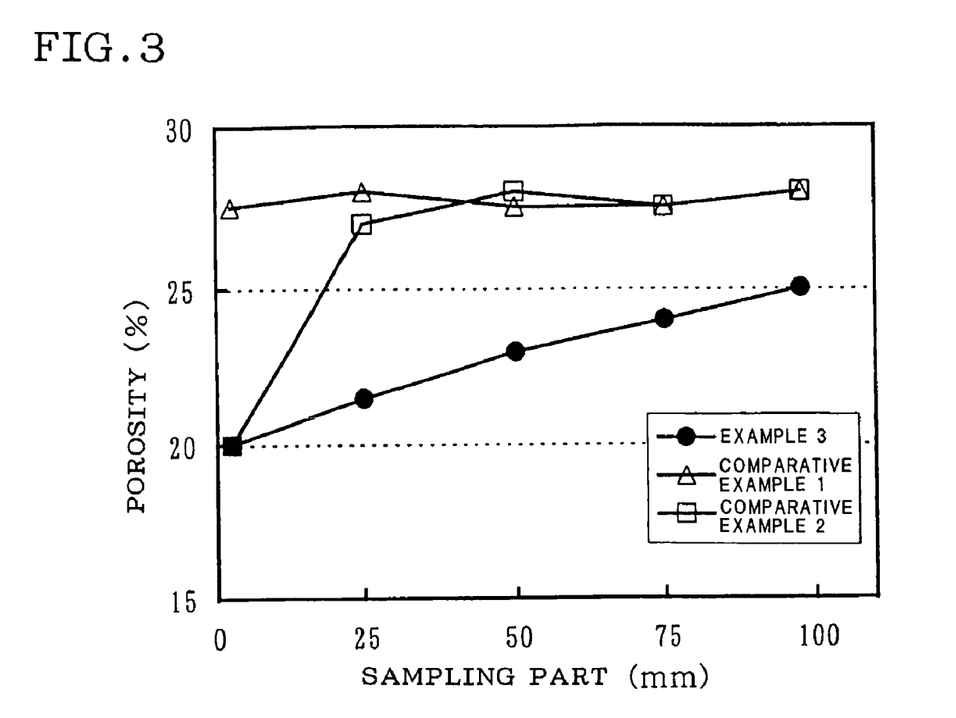
FIG. 3 is a graph in which porosity (%) is plotted against the sampling parts (mm) on the ceramics honeycomb structures produced in examples and comparative examples.

The physical properties of the resulting ceramics honeycomb structures (Examples 1-13 and Comparative Examples 1-4) were measured by the following methods and the characteristics were evaluated. The results are shown in Tables 1 and 2. The porosity (%) in the sampling part (mm) of the ceramics honeycomb structures of Example 3 and Comparative Examples 1 and 2 is shown in Table 3, and a graph in which porosity (%) is plotted against the sampling parts (mm) is shown in FIG. 3.

Figure 1:
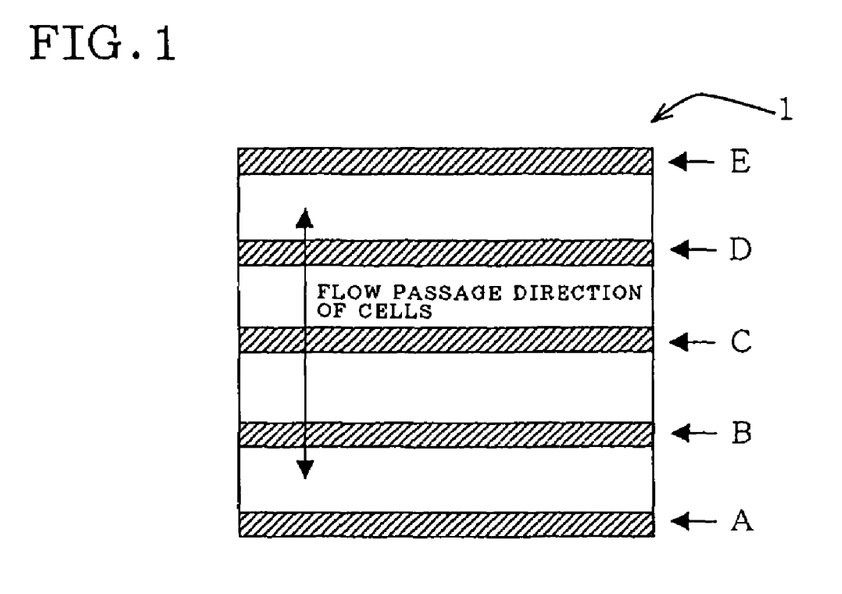
FIG. 1 is a schematic side view of a ceramics honeycomb structure which shows the parts from which samples are taken (A-E) (hereinafter referred to as sampling parts).
Figure 2:
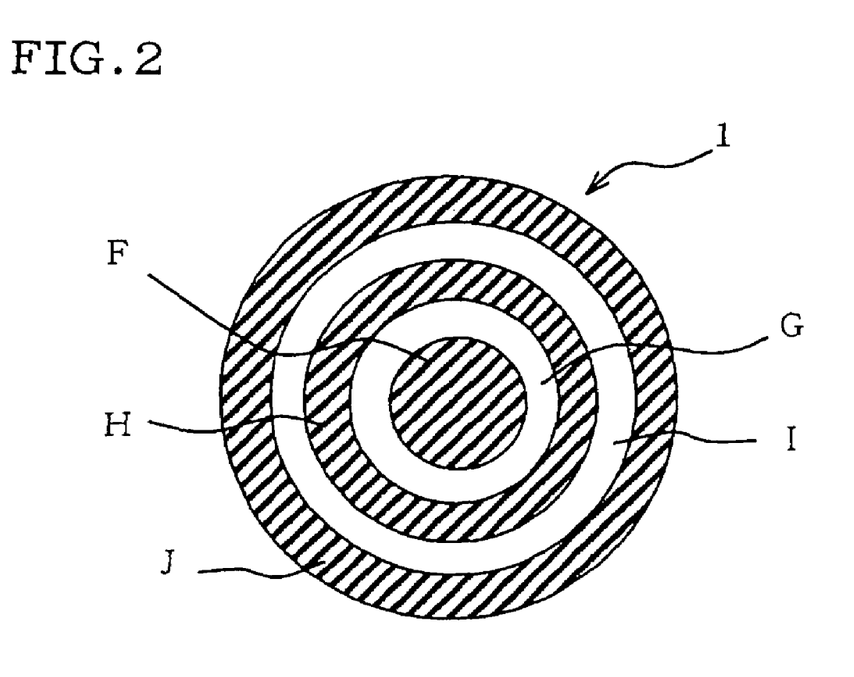
FIG. 2 is a schematic view of a section perpendicular to the flow passage of cells of a ceramics honeycomb structure which shows the sampling parts (F-J).

1. Porosity (1) FIG. 1 is a schematic side view of a ceramics honeycomb structure which shows the sampling parts (A-E), and FIG. 2 is a schematic view of a section perpendicular to the flow passage direction of cells which shows the sampling parts (F-J). As shown in FIG. 1 and FIG. 2, the sampling parts A-J of the ceramics honeycomb structure 1 which are samples to be measured were cut out at a given length (A-E: thickness 5 mm, F-J: width 10 mm) (A: 2.5 mm (at a position of 0-5 mm from the inflow end part side), B: 25 mm (at a position of 22.5-27.5 mm from the inflow end part side), C: 50 mm (at a position of 47.5-52.5 mm from the inflow end part side), D: 75 mm (at a position of 72.5-77.5 mm from the inflow end part side), E: 97.5 mm (at a position of 95-100 mm from the inflow end part side), F: 5 mm (at a position of 0-10 mm from the central part of a section perpendicular to the flow passage direction of cells), G: 15 mm (at a position of 10-20 mm from the central part of a section perpendicular to the flow passage direction of cells), H: 25 mm (at a position of 20-30 mm from the central part of a section perpendicular to the flow passage direction of cells), I: 35 mm (at a position of 30-40 mm from the central part of a section perpendicular to the flow passage direction of cells), J: 45 mm (at a position of 40-50 mm from the central part of a section perpendicular to the flow passage direction of cells)). In FIG. 1, the tip part of the inflow end part side is a position of 0, and the tip part side of the outflow end part is a position of 100 mm. In FIG. 2, the central part viewing from the outflow end part side is a position of 0, and the outer peripheral surface is a position of 50 mm.

(2) The sample for measurement which was cut out was dried at 150° C. for 2 hours and put in a container, which was set in the apparatus.

(3) Mercury was poured into the container, a pressure corresponding to a specified pore diameter was applied, and volume of mercury absorbed in the sample was obtained.

(4) A pore distribution was obtained by calculating from the pressure and the volume of mercury absorbed.

(5) A pore volume was obtained by calculating from the volume of mercury absorbed upon application of a pressure of 68.6 MPa (700 $kgf/cm^2$).

(6) The porosity was obtained by the following formula from the total pore volume.

Porosity (%)=total pore volume (per 1 g)×100/(total pore volume (per 1 g)+1/2.52).

2. Erosion Resistance

Figure 7:
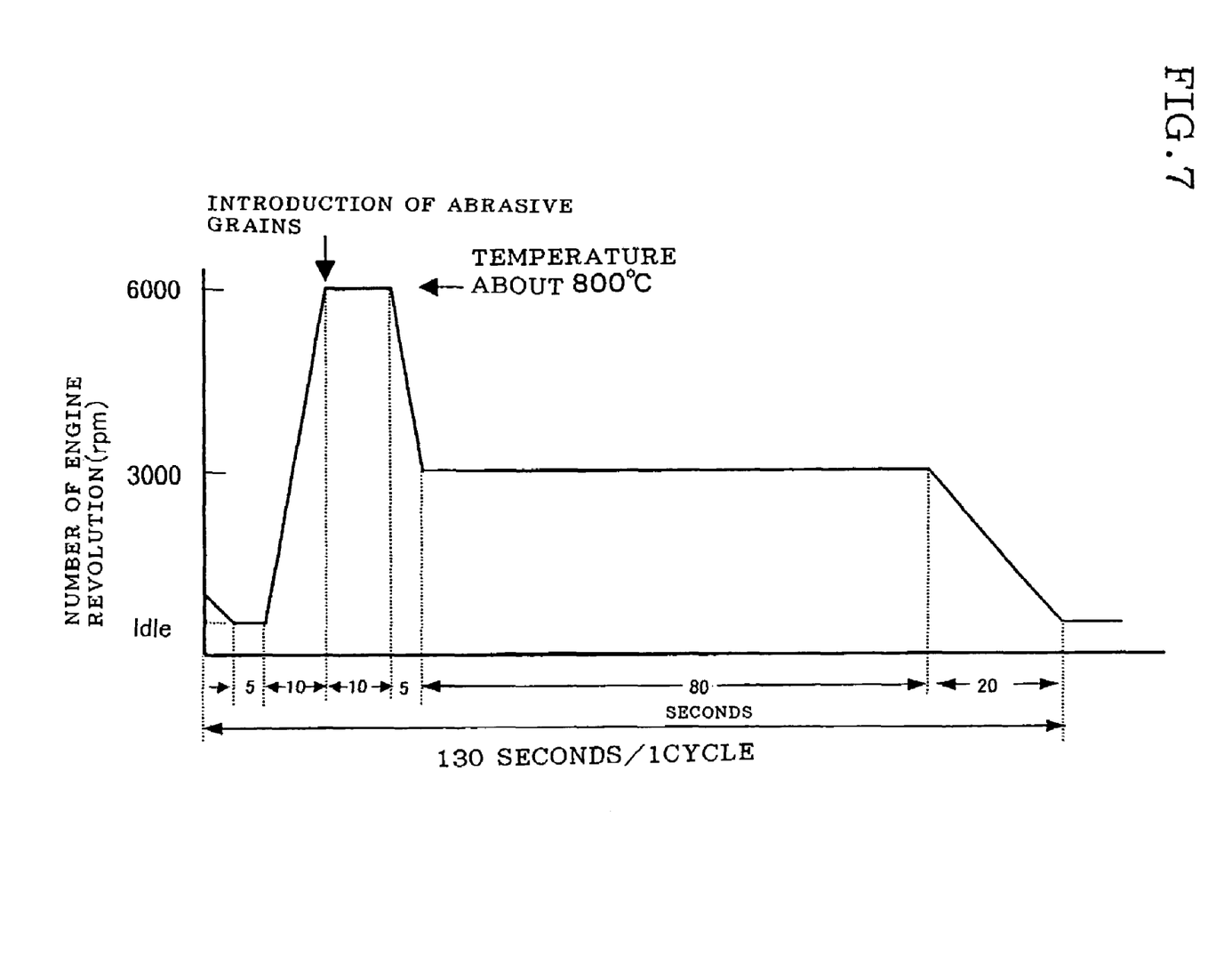
FIG. 7 is a graph which shows the condition of engine speed in erosion test.

A metal can in which a ceramic honeycomb structure was held and stored was connected to an exhaust port of a gasoline engine of 4 cylinders (in-line) and 1.8 liter in cylinder volume. That is, the sample was disposed close to the engine. Then, the engine was operated under the conditions shown in FIG. 7, and 0.1 g of abrasive grains (silicon carbide, GC320, average particle diameter 50 μm) were introduced when the number of revolutions reached 6000 rpm. Furthermore, the operation of engine was continued under the conditions shown in FIG. 7, and abrasive grains were introduced once per two cycles (one cycle being 130 seconds) and this was continuously repeated. Several tests were conducted with changing the total introduction amount of the abrasive grains from about 2 g to about 16 g, and from the results, the erosion amount (air erosion volume) of the ceramics honeycomb structure when the introduction amount of abrasion grains was 10 g was calculated.

Figure 8:
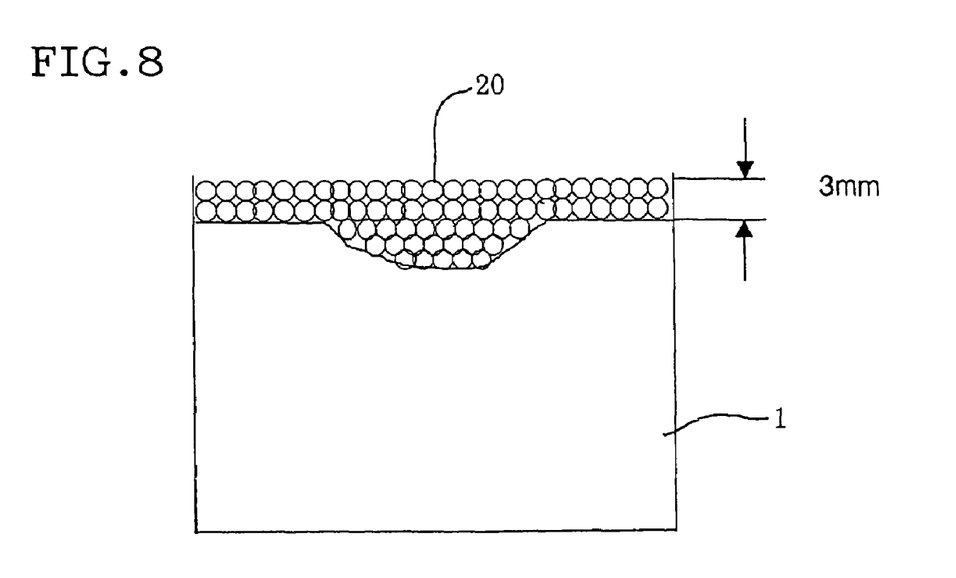
FIG. 8 schematically shows the method for measurement of erosion amount.

The erosion amount was determined in the following manner. A rubber sheet was wound round the working end face on the side of measurement of the erosion amount of the ceramics honeycomb structure 1 and ceramics beads 20 having a diameter of 1.5 mm were laid compactly in the structure at a height of about 3 mm. Thereafter, the beads were recovered and the beads volume was measured, and the difference between the beads volume after the erosion test and that before the test was obtained. This was conducted thrice and the average value was taken as the erosion amount. Evaluation was conducted on three ceramics honeycomb structures obtained in each example and comparative example, and when all of the erosion amounts exceeded 3 cc, this was evaluated to be unacceptable for practical use and is shown by X, when all of the erosion amounts were 2-3 cc, this is shown by ○, and all of the erosion amounts were less than 2 cc, this is shown by ◎.

3. Isostatic Strength

A pressure applied at break was measured by conducting the test in accordance with Automobile Standard JASO M505-87, and this pressure was taken as isostatic strength ($kg/cm^2$).

4. Thermal Shock Resistance

The ceramics honeycomb structure was heated to a given temperature by an electric furnace, and then taken out and put in an atmosphere of room temperature of 20° C. In both of the state of high temperature just after taking out and the state after cooling (20° C.) with cold air, occurrence of defects such as cracks due to thermal shock was visually examined. When no defects were seen, the heating temperature was further raised and the test was repeated up to a temperature at which defects occurred. The critical temperature at which occurrence of defects was seen was ascertained, and the thermal shock resistance was evaluated.

TABLE 1

| Honeycomb structure to be treated with reinforcing agent | Reinforcing agent Kind | Mixing ratio (mass ratio) | Method for coating & impregnating with reinforcing agent | Porosity (%) Sampling portion A | B | C | D | E | Amount of erosion (cc) (n 3) | Evaluation | Isostatic strength (kg/cm²) (n 5) Value measured | Average value | Thermal Shock Resistance (n 5) Critical temperature (° C.) |
|---|---|---|---|---|---|---|---|---|---|---|---|---|---|
| Example 1 | Unfired *1 DMSO *2 | 100 | Whole dipping | 24 | 24.5 | 25.5 | 26.5 | 27 | 2.2~2.5 | ○ | 21~26 | 23 | 800 |
| Example 2 | Unfired *1 MHSO *4/DMSO *3 | 10/90 | Whole dipping | 24 | 25 | 25.5 | 26 | 26.5 | 2.0~2.4 | ○ | 22~24 | 23 | 800 |
| Example 3 | Unfired *1 MHSO *4/DMSO *3 | 20/80 | Whole dipping | 20 | 21.5 | 23 | 24 | 25 | 1.2~1.5 | ◎ | 22~26 | 25 | 800 |
| Example 4 | Unfired *1 MHSO *4/DMSO *3 | 50/50 | Whole dipping | 12.5 | 14 | 15.5 | 17 | 19 | 0.3~0.6 | ◎ | 29~31 | 30 | 780 |
| Example 5 | Unfired *1 MHSO *4/Kerosene *6 | 10/90 | Whole dipping | 24 | 25 | 26 | 26.5 | 27 | 2.1~2.3 | ○ | 21~24 | 22 | 800 |
| Example 6 | Unfired *1 MHSO *4/Kerosene *6 | 20/80 | Whole dipping | 20.5 | 21.5 | 23 | 24 | 24.5 | 1.3~1.8 | ◎ | 23~29 | 26 | 800 |
| Example 7 | Unfired *1 MHSO *4/Kerosene *6 | 50/50 | Whole dipping | 13 | 14.5 | 15.5 | 17 | 18.5 | 0.4~0.7 | ◎ | 30~33 | 32 | 790 |
| Example 8 | Unfired *1 SAO *5/DMSO *3 | 10/90 | Whole dipping | 25 | 25.5 | 26 | 26.5 | 26.5 | 2.5~2.9 | ○ | 21~24 | 22 | 800 |
| Example 9 | Unfired *1 SAO *5/DMSO *3 | 20/80 | Whole dipping | 22.5 | 23.5 | 24.5 | 25.5 | 27 | 2.0~2.5 | ◎ | 22~27 | 24 | 800 |
| Example 10 | Unfired *1 SAO *5/DMSO *3 | 50/50 | Whole dipping | 17 | 18.5 | 19.5 | 21 | 22.5 | 0.7~1.2 | ◎ | 23~27 | 26 | 800 |
| Example 11 | Unfired *1 SiO₂ powder/Kerosene *6 | 5/95 | Whole dipping | 19 | 21 | 23 | 24.5 | 25 | 1.1~1.7 | ◎ | 22~26 | 23 | 780 |
| Example 12 | Fired MHSO *4/DMSO *3 | 20/80 | Whole dipping | 20 | 21.5 | 22.5 | 23.5 | 25 | 1.2~1.6 | ◎ | 23~26 | 25 | 800 |

TABLE 1-continued

| Honeycomb structure to be treated with reinforcing agent | Reinforcing agent | | Method for coating & impregnating Mixing ratio (mass ratio) | Method for coating & impregnating with reinforcing agent | Porosity (%) Sampling portion | | | | | Erosion resistance (n 3) | | Isostatic strength (n 5) (kg/cm²) | | Thermal Shock Resistance (n 5) Critical temperature value (° C.) |
|---|---|---|---|---|---|---|---|---|---|---|---|---|---|---|
| | | Kind | | | A | B | C | D | E | Amount of erosion (cc) | Evaluation | Value measured | Average value | |
| Comp. Exam. 1 | — | None | — | — | 27.5 | 28 | 27.5 | 27.5 | 28 | 4.2~5.1 | X | 18~23 | 20 | 800 |
| Comp. Exam. 2 | Unfired *1 | SiO₂ powder/ Kerosene *6 | 5/95 | Dipping of 5 cm from end face | 20 | 27 | 28 | 27.5 | 28 | 1.6~2.2 | ○ | 17~23 | 20 | 690 |

*1: Dried structure before firing
*2: Dimethyl silicone oil (manufactured by Shin-Etsu Chemical Co. Ltd., Trade name: KF96-100 CS, absolute viscosity: about 100 mPa · s)
*3: Dimethyl silicone oil (manufactured by Shin-Etsu Chemical Co. Ltd., Trade name: KF96L-0.65 CS, absolute viscosity: 0.65 mPa · s)
*4: Methyl hydrogen silicone oil (manufactured by Shin-Etsu Chemical Co. Ltd., Trade name: KF99, absolute viscosity: 20 mPa · s)
*5: Silicone alkoxy oligomer (manufactured by Shin-Etsu Chemical Co. Ltd., Trade name: KR-500, absolute viscosity: 0.65 mPa · s)
*6: Petroleum hydrocarbon (manufactured by Nisseki-Mitsubishi Co. Ltd., Trade name: Kerosene/Kurisef oil F8 mixed oil (main component: kerosene)

TABLE 2

| Honeycomb structure to be treated with reinforcing agent | Reinforcing agent | | Mixing ratio (mass ratio) | Porosity (%) Sampling portion | | | | | Erosion resistance (n 3) | | Isostatic strength (n 5) (kg/cm²) | | Thermal Shock Resistance (n 5) Critical temperature value (° C.) |
|---|---|---|---|---|---|---|---|---|---|---|---|---|---|
| | | Kind | | F | G | H | I | J | Amount of erosion (cc) | Evaluation | Value measured | Average value | |
| Example 13 | Unfired *1 | MHSO *2/ DMSO *3 | 20/80 | 25.0 | 23.5 | 22.0 | 21.0 | 20.0 | 1.6~2.0 | ○ | 24~27 | 26 | 800 |
| Comp. Exam. 3 | — | None | — | 27.5 | 27.5 | 27.5 | 28.0 | 28.0 | 4.2~5.1 | X | 18~23 | 20 | 800 |
| Comp. Exam. 4 | Unfired *1 | MHSO *2/ DMSO *3 | 50/50 | 25.0 | 23.0 | 21.0 | 18.0 | 15.0 | 0.5~1.2 | ◎ | 23~30 | 27 | 680 |

*1: Dried structure before firing
*2: Methyl hydrogen silicone oil (manufactured by Shin-Etsu Chemical Co. Ltd., Trade name: KF99, absolute viscosity: 20 mPa · s)
*3: Dimethyl silicone oil (manufactured by Shin-Etsu Chemical Co. Ltd., Trade name: KF96L-0.65 CS, absolute viscosity: 0.65 mPa · s)

TABLE 3

| | Porosity (%) Sampling portion (mm) | | | | |
|---|---|---|---|---|---|
| | 2.5 | 25 | 50 | 75 | 97.5 |
| Example 3 | 20 | 21.5 | 23 | 24 | 25 |
| Comparative Example 1 | 27.5 | 28 | 27.5 | 27.5 | 28 |
| Comparative Example 2 | 20 | 27 | 28 | 27.5 | 28 |

(Evaluation)

As is clear from the results shown in Table 1, the ceramics honeycomb structures of Examples 1-12 were improved in erosion resistance and isostatic strength as compared with the ceramics honeycomb structure of Comparative Example 1, and were improved in isostatic strength and thermal shock resistance as compared with the ceramics honeycomb structure of Comparative Example 2. The reasons for the ceramics honeycomb structures of Examples 1-12 being superior in erosion resistance to the ceramics honeycomb structure of Comparative Example 1 can be considered that the porosity in the inflow end part (A) was lower than that in the outflow end part (E), and the porosity in the inflow end part (A) was 25% or lower in Examples 1-12 while it was high, namely, 27.5% and low in the part against which the exhaust gas struck in Comparative Example 1.

The reasons for the ceramics honeycomb structures of Examples 1-12 being superior in isostatic strength to the ceramics honeycomb structures of Comparative Examples 1 and 2 can be considered that the whole of the honeycomb structures showed a tendency of being lower in porosity although it is slight, specifically, the average of the porosity of the whole ceramics honeycomb structures of Examples 1-12 was less than 26% while that of the ceramics honeycomb structures of Comparative Examples 1 and 2 was 26% or higher and besides the proportion of the parts having a porosity of 26% or higher was great. Furthermore, the ceramics honeycomb structures of Examples 1-12 were superior in thermal shock resistance to the ceramics honeycomb structures of Comparative Examples 1 and 2. It is considered that this is because the ceramics honeycomb structures of Examples 1-12 had no parts where the porosity greatly changed and thus showed no abrupt change in the characteristics such as thermal expansion coefficient as is clear from the facts that, for example, the gradual increasing rate of the porosity per unit volume ($cm^3$) between the sampling parts (A)-(B) in the ceramics honeycomb structure of Comparative Example 2 was 0.28%/mm while the gradual increasing rate of the porosity per unit volume ($cm^3$) between the sampling parts (A)-(B) in the ceramics honeycomb structure of Example 11 was 0.08%/mm, which means a gentle change of the porosity. Moreover, the reason can also be considered that as is clear from the results shown in Table 3 and FIG. 3, the generated heat stress and residual stress at the time of production decreased due to the gentle gradual increase of the porosity from the inflow end part (A) to the outflow end part (E).

Furthermore, it can be seen from the results shown in Table 2 that the ceramics honeycomb structure of Example 13 was improved in erosion resistance and isostatic strength as compared with the ceramics honeycomb structure of Comparative Example 3. The reason for the ceramics honeycomb structure of Example 13 being superior in erosion resistance to the ceramics honeycomb structure of Comparative Example 3 can be considered that the ceramics honeycomb structure of Example 13 was lower in porosity of the inflow end part as compared with the ceramics honeycomb structure of Comparative Example 3 since the ceramics honeycomb structure of Example 13 was produced by once wholly dipping in the reinforcing agent like the ceramics honeycomb structures of Examples 1-12. The reason for the ceramics honeycomb structure of Example 13 being superior in isostatic strength to the ceramics honeycomb structure of Comparative Example 3 can be considered that the porosity of the outer peripheral part (J) was lower than that of the central part (F). Moreover, the ceramics honeycomb structure of Example 13 did not show deterioration of thermal shock resistance as compared with the ceramics honeycomb structure of Comparative Example 3. It is considered that this is because the porosity gently gradually decreases from the central part (F) to the outer peripheral part (J) and hence the generated heat stress and the residual stress at the time of production did not increase.

Moreover, when Comparative Example 4 is compared with Example 13, Comparative Example 4 gave erosion resistance and isostatic strength equal to or higher than that of Example 13, but the thermal shock resistance of Comparative Example 3 was extremely inferior. It is considered that this is because the gradual decreasing rate of the porosity per unit volume ($cm^3$) from the central part (F) to the outer peripheral part (J) was greater as compared with Example 13.

INDUSTRIAL APPLICABILITY

As explained above, the ceramics honeycomb structure of the present invention has a structure in which a porosity per unit volume ($cm^3$) gradually increases from the inflow end part side to the outflow end part side at a rate lower than a given rate, and hence it has an excellent erosion resistance, isostatic strength and thermal shock resistance.

Furthermore, there is provided a method for producing the ceramics honeycomb structure according to which a substrate (a dried substrate before firing) or a fired substrate having a honeycomb structure obtained using a given clay is coated and impregnated with a given reinforcing agent and then fired (or refired) and this method hardly causes defects such as distortion of partition walls and hardly gives variation in physical properties between the products.

The invention claimed is:

1. A ceramics honeycomb structure formed of a plurality of cells forming a fluid flow passage partitioned by porous partition walls, and comprising an inflow end part allowing fluid to flow therein, an outflow end part allowing fluid to flow therefrom, and an outer peripheral part including an outer peripheral surface, wherein the honeycomb structure has a porosity per unit volume ($cm^3$) that gradually increases from the inflow end part side to the outflow end part side at a rate of 0.2%/mm or less, the honeycomb structure further having a reinforcing agent impregnated therein, the reinforcing agent comprising at least one element selected from the group consisting of Si, Ti, Mg and Al.

2. A ceramics honeycomb structure according to claim 1 which has a structure where the porosity per unit volume ($cm^3$) gradually increases from the inflow end part side to the outflow end part side at a rate of 0.1%/mm or less.

3. A ceramics honeycomb structure according to claim 1, wherein a porosity per unit volume ($cm^3$) in the area of up to 150 mm from the flow passage end face of the inflow end part side in the inward direction of the flow passage is 10-50%.

4. A ceramics honeycomb structure according to claim 2, wherein a porosity per unit volume ($cm^3$) in the area of up to 150 mm from the flow passage end face of the inflow end part side in the inward direction of the flow passage is 10-50%.

5. A ceramics honeycomb structure according to claim 1, wherein the minimum thickness of the partition walls is 0.030-0.076 mm.

6. A ceramics honeycomb structure according to claim 1 which comprises at least one ceramics selected from the group consisting of cordierite, alumina, mullite, silicon nitride, aluminum titanate, zirconia and silicon carbide.

7. A ceramics honeycomb structure according to claim 1, wherein the section perpendicular to the flow passage has a shape of circle, ellipse, oval, trapezoid, triangle, tetragon, hexagon or left and right asymmetric irregular shape.

8. A ceramics honeycomb structure according to claim 1, wherein the section of the cells perpendicular to the flow passage has a shape of triangle, tetragon or hexagon.

9. A ceramics honeycomb structure according to claim 1 which is used as automobile exhaust gas purification catalyst carriers.

10. A ceramics honeycomb structure according to claim 1 which has a catalyst component supported on the partition walls and is incorporated into a catalyst converter by being held at the outer peripheral surface of the outer wall.

* * * * *